United States Patent
Orita et al.

(10) Patent No.: US 8,041,936 B2
(45) Date of Patent: Oct. 18, 2011

(54) PERSISTING VALUE RELEVANT TO DEBUGGING OF COMPUTER SYSTEM DURING RESET OF COMPUTER SYSTEM

(75) Inventors: Ryuji Orita, Redmond, WA (US); Mark A. Brandyberry, Austin, TX (US); Mehul M. Shah, Austin, TX (US); Sean P. Brogan, Kenmore, WA (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 11/926,083

(22) Filed: Oct. 28, 2007

(65) Prior Publication Data

US 2009/0113194 A1    Apr. 30, 2009

(51) Int. Cl.
*G11C 29/00* (2006.01)
*G06F 11/22* (2006.01)

(52) U.S. Cl. .............. 713/2; 713/1; 713/100; 714/723; 714/776

(58) Field of Classification Search ............ 713/1, 2, 713/100; 714/723, 776
See application file for complete search history.

(56) References Cited

U.S. PATENT DOCUMENTS

| | | | |
|---|---|---|---|
| 5,522,087 A * | 5/1996 | Hsiang | 710/18 |
| 5,646,535 A * | 7/1997 | Dornier | 324/556 |
| 5,680,599 A * | 10/1997 | Jaggar | 712/244 |
| 6,170,027 B1 | 1/2001 | Lu et al. | |
| 6,714,996 B1 | 3/2004 | Kobayashi | |
| 6,813,675 B2 | 11/2004 | Wu et al. | |
| 6,910,157 B1 * | 6/2005 | Park et al. | 714/36 |
| 6,925,510 B2 | 8/2005 | Yu | |
| 7,062,593 B2 | 6/2006 | Chen | |
| 7,111,183 B1 | 9/2006 | Klein et al. | |
| 7,127,531 B2 * | 10/2006 | Biggs et al. | 710/5 |
| 7,181,560 B1 * | 2/2007 | Grand et al. | 710/300 |
| 7,319,404 B2 * | 1/2008 | Sturges et al. | 340/635 |
| 7,565,579 B2 * | 7/2009 | Shi | 714/38 |
| 7,591,018 B1 * | 9/2009 | Lee | 726/24 |
| 2008/0126830 A1* | 5/2008 | Balazich et al. | 714/2 |
| 2008/0178048 A1* | 7/2008 | Balazich et al. | 714/48 |

* cited by examiner

*Primary Examiner* — Abdelmoniem Elamin
(74) *Attorney, Agent, or Firm* — Thomas Tyson

(57) ABSTRACT

The last value of an element of a computing system is continually stored within a first register. The element is cleared during any restart or reset of the computing system. The last value is relevant to debugging of the computing system when the computing system fails to perform as expected and/or as desired. Upon receiving an instruction to reset the computing system via a first reset signal corresponding to pressing of a reset button or a second reset signal corresponding to a baseboard management controller issuing a reset command, the last value of the element as stored within the first register is copied to a second register. The computing system is then reset. The last value of the element as stored within the second register persists within the second register during this type of reset, but is cleared during any other reset or restart of the computing system.

13 Claims, 3 Drawing Sheets

PERSISTING VALUE RELEVANT TO DEBUGGING OF COMPUTER SYSTEM DURING RESET OF COMPUTER SYSTEM

FIELD OF THE INVENTION

The present invention relates generally to values that are relevant to debugging of a computing system when the computing system fails to perform as expected and/or as desired. These values can include the values written to an input/output port of a low-pin count bus by a basic input/output system. The invention relates more particularly to persisting such values during reset of the computing system. The reset of the computing system can result from the pressing of a reset button or a baseboard management controller issuing a reset command.

BACKGROUND OF THE INVENTION

Many computing systems having firmware, such as a basic input/output system (BIOS), perform power-on self test (POST) immediately after the computing system has been restarted or reset. The POST initializes and configures various components of the computing system, such as processors, memory, chipsets, and peripheral devices, and tests each such component before booting the operating system (OS) of the computing system. If there is a problem with a component, the BIOS may display an error message on a display device of the computing system.

The POST may not be able to proceed if there is an unexpected error within a component of the computing system, and can sometimes halt without providing any indication of the problem that has been encountered. The BIOS may further be unable to display an error message relating to a problem with a component on the display device if the problem is detected before the display device has been initialized. To determine the cause of such problems, some computing systems include a seven-segment light-emitting diode (LED) display that can indicate a relevant error via a POST checkpoint number.

The BIOS writes the checkpoint number to an input/output (I/O) port, such as I/O port 80h of a low-pin count (LPC) bus of the computing system. The single-byte data that is written to I/O port 80h is then displayed on the seven-segment LED display. When the computing system halts during the POST, the LED display indicates where the POST stopped executing. As such, the LED display is useful for debugging purposes.

However, many computing systems do not include such an LED display, making debugging more difficult. Furthermore, in some situations, the LED display even if present may not be useful. For example, some computing systems, especially server computing systems, include a secondary microprocessor, which is referred to as a service processor and/or as a baseboard management controller (BMC). The secondary microprocessor can detect when the computing system has stopped responding, and in response automatically reset the system. However, when the computing system is reset, the information displayed on the LED display is lost. As such, the computing system can be reset before a user has an opportunity to look at the LED display.

SUMMARY OF THE INVENTION

The present invention relates to persisting a value relevant to the debugging of a computer system during the reset of the computing system. A method of an embodiment of the invention continually stores a value of an element of the computing system within a first register. The element may be an input/output (I/O) port exposed on a low-pin count (LPC) bus to which a port I/O (PIO) value is written by a system software component like a basic input/output system (BIOS).

The last value of the element in question is cleared from the element as a result of any restart or reset of the computing system. The last value is further relevant to the debugging of the computing system when the computing system fails to perform as expected and/or as desired. The method receives an instruction to reset the computing system, via a first reset signal corresponding to pressing of a reset button and/or a second reset signal corresponding to a baseboard management controller (BMC) of the computing system issuing a reset command. Those reset signals are typically asserted when a user or the BMC tries to recover the computing system from unexpected failures, therefore the last value of the element is useful to determine the cause of the failure. In response to the assertion of those reset signals, the last value of the element as stored within the first register is copied to a second register.

After the computer system is reset, the last value in the element is cleared from the first register because the system software component starts continually writing a new value to the port, however the last value which has been copied from the first register to the second register prior the reset still persists within the second register. Also, any reset or restart which is initiated by other than those reset signals is not considered as an attempt of a recovery from a system failure, therefore such a reset or restart does not affect the second register in the element, and the last value as stored within the second register still can be retrieved. Such a reset or restart can include reset or restart of the computing system as initiated by the operating system, and/or by using a keyboard (such as the known Control+Alt+Delete key combination), or other input device of the computing system, for instance.

A computing system of one embodiment of the invention includes a bus having a port where a system software component can continually write a value which is relevant to debugging of the computing system when the computing system fails to perform as expected and/or as desired. The computing system may further include a reset button, where pressing of the reset button issues a first reset signal, and/or a BMC, which is capable of issuing a second reset signal.

The computing system includes a complex programmable logic device (CPLD) connected to the bus and that CPLD is capable of receiving the first and the second reset signals. The CPLD has a first register that the CPLD updates with the value written to the port of the bus by the system software component. The CPLD also has a second register to which the CPLD copies the value currently stored within the first register before the CPLD resets the computing system in response to the CPLD receiving the first and/or the second reset signals. The second register is not affected during any reset or restart of the computing system other than the reset of the computing system in response to the CPLD receiving the first and/or the second reset signals.

A computing system of another embodiment of the invention also includes a bus having a port where a system software can continually write a value. As before, the value is relevant to debugging of the system when the computing system fails to perform as expected and/or as desired. The computing system further includes a reset button, where pressing of the reset button issues a reset signal. The computing system also includes a BMC connected to the bus and capable of receiving the reset signal.

The BMC of the computing system has a first register that the BMC updates with the value written to the port of the bus by the system software component. The BMC also has a second register to which the BMC copies the value currently stored within the first register before the BMC decides to reset the computing system and/or has received the reset signal. The second register is not affected during any reset or restart of the computing system other than the reset of the computing system in response to the BMC deciding to reset the computing system and/or the BMC receiving the reset signal.

Embodiments of the invention provide for advantages over the prior art. The first register is constantly updated with the value that is relevant to debugging of the computing system. When the computing system is reset due to a reset button being pressed or a BMC issuing a reset command, the value currently stored in the first registered is persisted within the second register. After such a reset of the computing system, the first register may again be constantly updated. However, the value within the first register at the time of reset is still stored within the second register.

Therefore, the value can be retrieved from the second register to determine why the computing system was reset—i.e., to assist in debugging of the computing system. As such, a user has access to this information even when the computing system in question does not have a light-emitting diode (LED) display on which the information would otherwise be displayed. Furthermore, the user has access to this information even when a secondary processor has detected that the computing system has stopped responding and has automatically reset the system causing the information to no longer be displayed on the LED display (if present).

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview/Method

Figure 1:
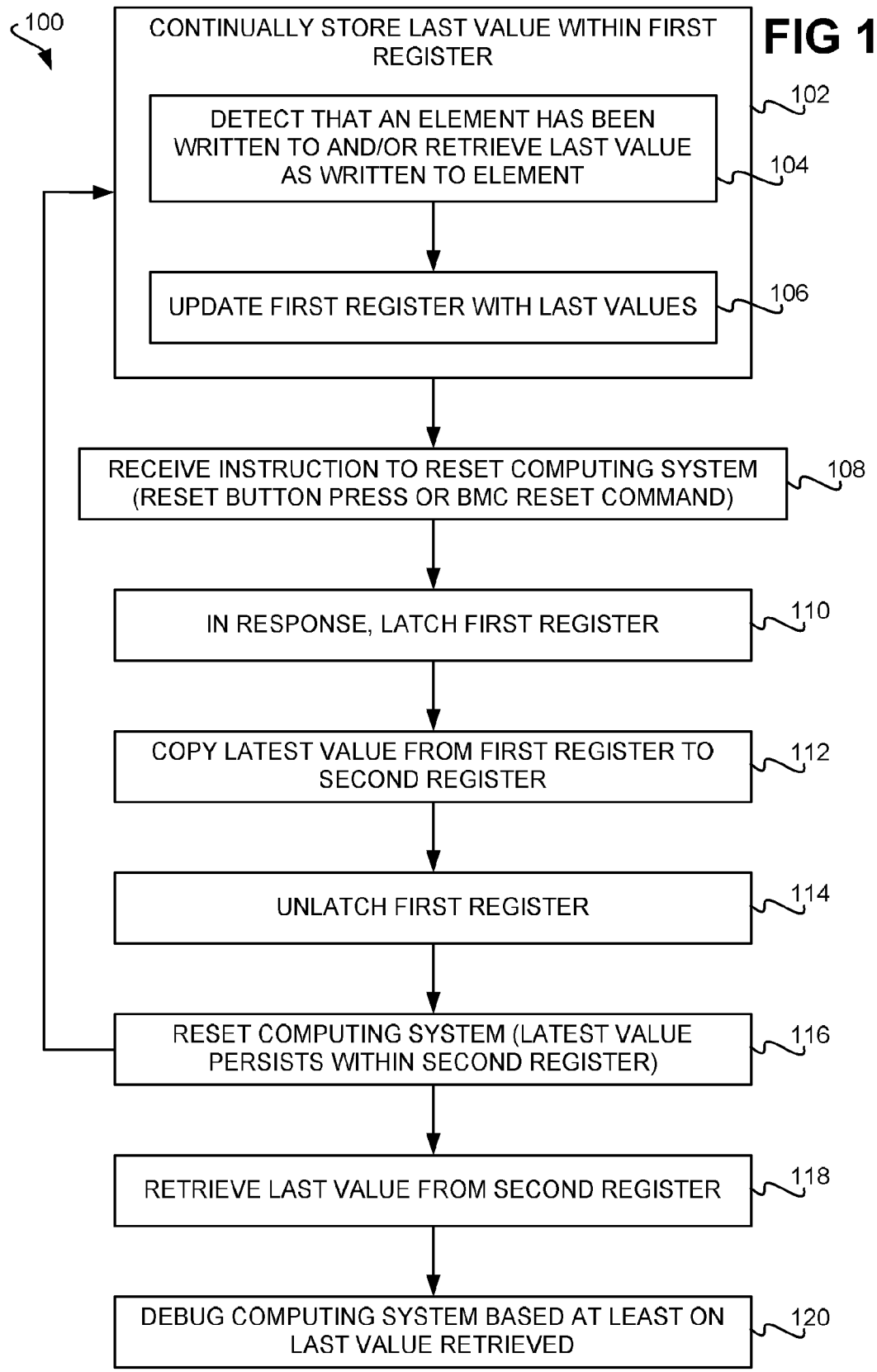
FIG. 1 is a flowchart of a method, according to an embodiment of the invention.

FIG. 1 shows a method 100, according to an embodiment of the invention. The method 100 is performed in relation to an element of a computing system. The element may be an input/output (I/O) port exposed on a low-pin count (LPC) bus of the computing system, to which a basic input/output system (BIOS) of the computing system writes a port I/O (PIO) value. In general, the last value written to the element prior to reset of the computing system is relevant to debugging the computing system when the computing system fails to perform as expected and/or as desired, and has been reset. Furthermore, this value of the element is cleared from the element during any restart or reset of the computing system.

The method 100 continually stores a value of the element within a first register (102). In one embodiment, part 102 can be performed as follows. The method 100 may detect that the element has been written to with a new value (i.e., the last value), and/or the method 100 may retrieve the last value that has been written to the element (102). The method 100 then updates the first register with this last value.

The method 100 at some point receives an instruction to reset the computing system (108). This instruction is received in one of two ways. First, the computing system may have a reset button that is pressed by the user in response to, for instance, the user having detected or determined that the computing system is not properly performing. For example, the computing system may have become unresponsive. Pressing the reset button results in a first reset signal being generated, the first reset signal corresponding to the instruction to reset the computing system.

Second, the computing system may include a baseboard management controller (BMC), such as a service processor or another type of secondary processor, that has issued a reset command. For example, the BMC may have detected or determined that the computing system is not properly performing, such that it in response issues a reset command to reset the computing system. Issuance of the reset command by the BMC results in a second reset signal being generated, the second reset signal also corresponding to the instruction to reset the computer.

In response to the receipt of the instruction to reset the computing system, the first register is latched (110), and the last value of the element as stored in the first register is copied from the first register to a second register (112). The first register is then unlatched (114). The method 100 proceeds to reset the computing system (116). However, the last value of the element as has been stored within (i.e., copied to) the second register persists within the second register during and over reset of the computing system in response to the first reset signal or the second reset signal being received in part 108 of the method 100.

Thereafter, the method 100 repeats at part 102, where a value of the element is again continually stored within the first register. However, the last value of the element prior to the computing system being reset in part 106, as stored and persisted within the second register, may at some point be retrieved (118). As such, the computing system can be debugged based at least on this value of the element stored and persisted within the second register prior to the computing system being reset (120). The value of the element stored and persisted within the second register may, for instance, provide information or clues as to why the computing system became unresponsive or otherwise failed to perform as expected and/or as desired.

It is noted, however, that the second register is not affected during any reset or restart other than reset of the computing device in part 116 in response to the first reset signal or the second reset signal being received in part 108. For example, if the computing system is reset by appropriately manipulating input devices like keyboards and pointing devices, the second register will not be affected.

As such, in at least one embodiment of the invention, the second register may be a volatile memory register, or may be a non-volatile memory register. If the second register is a volatile memory register, the value of the element copied to the second register prior to resetting the computing system does not persist during the cold start of the computer system—by turning off and then back on, and/or by removing power from and returning power to the computing system, as such a volatile memory register loses its contents (i.e. the value of the element stored therein) when power is removed computer system. If the second register is a non-volatile memory register, the second register is cleared during the cold start of the computer. The second register may be writable in order to allow a system software component to clear (or initialize), so it would be easy to determine whether or not the reset was happened by retrieving the value from the second register.

CPLD Embodiment

Figure 2:
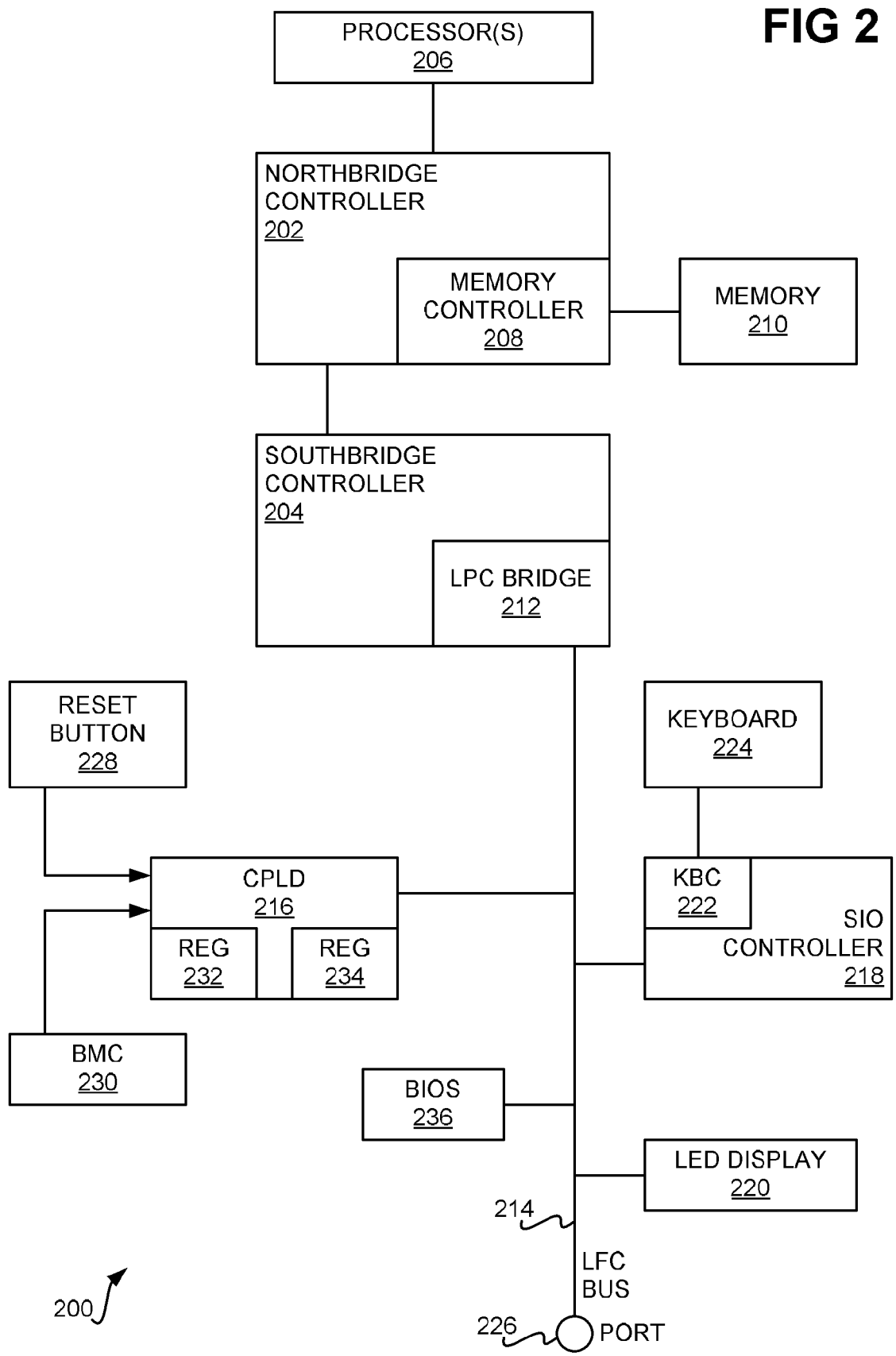
FIG. 2 is a diagram of a computing system in which a complex programmable logic device (CPLD) includes two registers for storing a value relevant to the debugging of the system, according to an embodiment of the invention.

FIG. 2 shows a computing system 200, according to a complex programmable logic device (CPLD)-port input/output (PIO) embodiment of the invention. In this embodiment, a CPLD performs the method 100 of FIG. 1, in relation to a PIO value as the value referred to in the method 100. The PIO value may be written to an input/output (I/O) port of a low-pin count (LPC) bus by a system software component such as a basic input/output system (BIOS). The I/O port of the LPC bus is thus the element referred to in the method 100 in this embodiment of the invention. A CPLD is a programmable logic device (PLD) that is made up of several simple PLD's (SPLD's) with a programmable switching matrix between logic blocks.

The computing system 200 includes a Northbridge controller 202 and a Southbridge controller 204 communicatively connected to one another. The Northbridge controller 202 and the Southbridge controller 204 together form the chipset architecture of the computing system 200. The Northbridge controller 202 is the higher-speed part of the chipset, and interconnects one or more processors 206 to memory 210. As such, the Northbridge controller 202 may be or include a memory controller 208 in one embodiment. In another embodiment, the memory controller 208 may be discrete to the Northbridge controller 202. The Northbridge controller 202 may also include a display adapter chipset in one embodiment.

The Southbridge controller 204 handles the remaining I/O, such as a peripheral component interconnect (PCI) bridge, parallel and serial AT attachment (ATA) storage devices, Universal Serial Bus (USB) devices, IEEE-1394 or FireWire devices, serial and parallel ports, audio ports, and so on. In particular, the Southbridge controller 204 is connected to an LPC bus 214 via an LPC bridge 212. The LPC bus 214 is also connected to the CPLD 216, a Super I/O (SIO) controller 218, a light-emitting diode (LED) display 220 (if present), and a BIOS 236.

The SIO controller 218 provides for input of standard input devices, such as a keyboard 224 that is communicatively connected to a keyboard controller (KBC) 222 of the SIO controller 218. The BIOS 236 performs the power-on self test (POST) that has been described in the background section. As such, the BIOS 236 writes values, such as checkpoint values as has been described in the background section, to an I/O port 226 of (i.e., exposed on) the LPC bus 214. These values are referred to as PIO values insofar as they are written to the I/O port 226, and are relevant to the debugging of the computing system 200. The I/O port 226 may be the I/O port 80h of the LPC bus 214. The LED display 220, when present, may display one-byte of data corresponding to the current value stored at the I/O port 226. The I/O port 226 is thus in this embodiment the element referred to in the method 100.

The CPLD 216 includes a first register 232 and a second register 234, corresponding to the first register and the second register referred to in the method 100. The CPLD 216 is able to receive an instruction to reset the computing system 200 in one of two ways. First, the CPLD 216 may receive a reset signal corresponding to the reset button 228 being pressed. Second, the CPLD 216 may receive a reset signal corresponding to the baseboard management controller (BMC) 230 issuing a reset command. In either case, the CPLD 216 in response resets the computing system 200.

The CPLD 216 continually stores a value of the I/O port 226 of the LPC bus 214 within the first register 232, as the BIOS 236 writes to the I/O port 226. Upon receiving a reset signal from the reset button 228 or the BMC 230, the CPLD 216 copies the value of the I/O port 226, as stored within the first register 232, to the second register 234 before resetting the computing system 200. Therefore, after the computing system 200 has been reset, the last value of the I/O port 226 prior to reset of the computing system 200 persists within the second register 234. As such, this value can be retrieved from the second register 234 for debugging purposes.

BMC Embodiment

Figure 3:
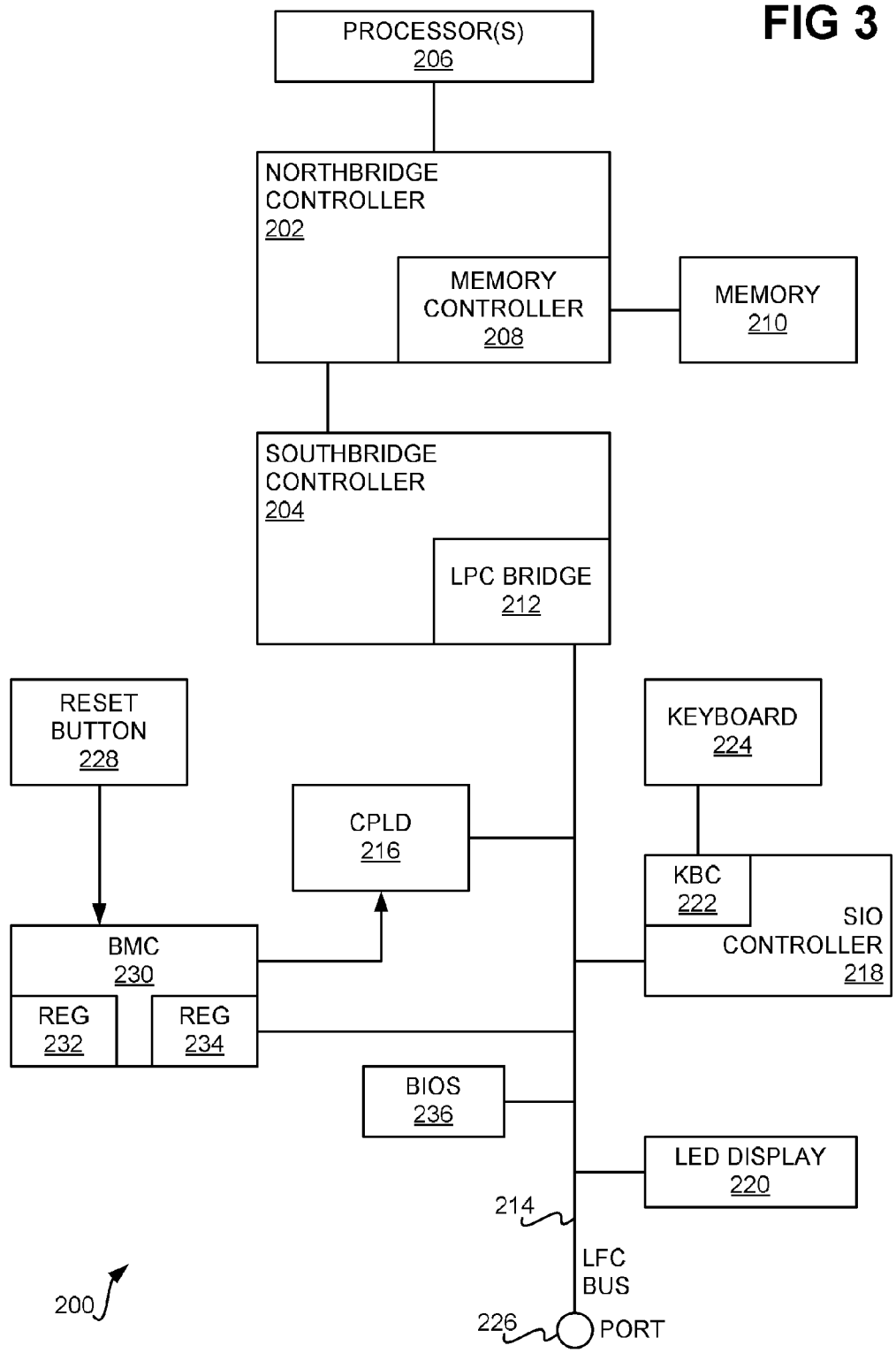
FIG. 3 is a diagram of a computing system in which a baseboard management controller (BMC) includes two registers for storing a value relevant to the debugging of the system, according to an embodiment of the invention.

FIG. 3 shows the computing system 200, according to a baseboard management controller (BMC) embodiment of the invention. In this embodiment, a BMC performs at least most of the method 100 of FIG. 1, in relation to a PIO value as the value referred to in the method 100. The PIO value may be written to an input/output (I/O) port of a low-pin count (LPC) bus by a system software component such as a basic input/output system (BIOS). The I/O port of the LPC bus is thus the element referred to in the method 100 in this embodiment of the invention. The BMC may be or include a secondary processor such as a service processor, in one embodiment, as has been described in the background section.

The computing system 200 again includes the Northbridge controller 202 and the Southbridge controller 204, as have been described in relation to FIG. 2. The Northbridge controller 202 interconnects the processors 206 to the memory 210, and may be or include the memory controller 208. In another embodiment, the memory controller 208 may be discrete to the Northbridge controller 202 (i.e., the controller 208 may be a separate component to the controller 202).

The Southbridge controller 204 is connected to the low pin-count (LPC) bus 214 via the LPC bridge 212. The LPC bus 214 is also connected to the CPLD 216, the Super I/O (SIO) controller 218, the light-emitting diode (LED) display 220 (if present), the basic input/output system (BIOS) 236, and the BMC 230. The SIO controller 218 provides for input of standard input devices, such as the keyboard 224 that is communicatively connected to a keyboard controller (KBC) 222 of the SIO controller 218.

The BIOS 236 performs the power-on self test (POST) that has been described in the background section. As such, the BIOS 236 writes values, such as checkpoint values as has been described in the background section, to the I/O port 226 of (i.e., exposed on) the LPC bus 214. These values are referred to as PIO values insofar as they are written to the I/O port 226, and are relevant to the debugging of the computing system 200. The I/O port 226 may be the I/O port 80h of the LPC bus 214. The LED display 220, when present, may display one-byte of data corresponding to the current value stored at the I/O port 226. The I/O port 226 is thus in this embodiment the element referred to in the method 100.

The BMC 230 includes the first register 232 and the second register 234, corresponding to the first register and the second register referred to in the method 100. The BMC 230 is able to receive an instruction to reset the computing system 200 in one of two ways. First, the BMC 230 may receive a reset signal corresponding to the reset button 228 being pressed. Second, the BMC 230 itself may decide to reset the computing system 200, which is considered herein as the BMC 230 receiving an instruction to reset the computing system 200. In either case, the BMC 230 instructs the CPLD 216 to reset the computing system 200, by issuing a reset command received by the CPLD 216. In response, the CPLD 216 resets the computing system.

The BMC 230 continually stores a value of the I/O port 226 of the LPC bus 214 within the first register 232, as the BIOS 236 writes to the I/O port 226. Upon receiving a reset signal from the reset button 228 or determining itself that the computing system 200 should be reset, the BMC 230 copies the value of the I/O port 226, as stored within the first register 232, to the second register 234 before resetting the computing system 200 by instructing the CPLD 216 to reset the computing 200 via issuance of a reset command to the CPLD 216. Therefore, after the computing system 200 has been reset, the last value of the I/O port 226 prior to reset of the computing system 200 persists within the second register 234. As such, this value can be retrieved from the second register 234 for debugging purposes.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
continually storing a value of an element of a computing system within a first register, the last value of the element cleared from the element during any restart or reset of the computing system, the last value relevant to debugging of the computing system when the computing system fails to perform as expected and/or as desired;
upon receiving an instruction to reset the computing system via one of a first reset signal corresponding to pressing of a reset button and a second reset signal corresponding to a baseboard management controller of the computing system issuing a reset command,
copying the last value of the element as stored within the first register to a second register; and,
resetting the computing system, the last value of the element as stored within the second register persisting within the second register during reset of the computing system in response to the first reset signal corresponding to pressing of the reset button or the second reset signal corresponding to the baseboard management controller issuing a reset command,
wherein the second register is cleared during any reset or restart other than reset of the computing system in response to the first reset signal corresponding to pressing of the reset button or the second reset signal corresponding to the baseboard management controller issuing a reset command.

2. The method of claim 1, further comprising:
after the computing system has been reset, retrieving from the second register the last value of the element prior to reset of the computing system; and,
debugging the computing system based at least on the last value of the element prior to reset of the computing system as retrieved from the second register.

3. The method of claim 1, further comprising:
latching the first register prior to copying the last value of the element as stored within the first register to the second register; and,
unlatching the first register after copying the last value of the element as stored within the first register to the second register.

4. The method of claim 1, wherein continually storing a value of the element of the computing system within the first register comprises:
detecting that the element has been written to; and,
updating the first register with the value that has been written to the element.

5. The method of claim 1, wherein continually storing a value of the element of the computing system within the first register comprises:
retrieving the last value that has been written to the element; and,
updating the first register with the value that has been written to the element.

6. The method of claim 1, wherein the element is an input/output (I/O) port exposed on a low-pin count (LPC) bus of the computing system, the LPC bus connecting a Southbridge controller of the computing system to at least one or more of a complex programmable logic device (CPLD) of the computing system and a baseboard management controller (BMC) of the computing system, the value of the element being a port I/O (PIO) value.

7. The method of claim 6, wherein the PIO value is written to the I/O port by a basic input/output system (BIOS) of the computing system.

8. The method of claim 1, wherein the method is performed by a complex programmable logic device (CPLD) of the computing system, such that both the first reset signal corresponding to pressing of the reset button and the second reset signal corresponding to the baseboard management controller of the computing system are received by the CPLD.

9. The method of claim 1, wherein the method is performed by the baseboard management controller (BMC) of the computing system, such that the first reset signal corresponding to pressing of the reset button is received by the BMC.

10. A computing system comprising:
a bus having a port, the port cleared during any restart or reset of the computing system;
a system software component to write a value to the port of the bus, the value relevant to debugging of the computing system when the computing system fails to perform as expected and/or as desired;
one of:
a reset button, where pressing of the reset button issues a first reset signal;
a baseboard management controller (BMC) capable of issuing a second reset signal;
a complex programmable logic device (CPLD) connected to the bus and capable of receiving the first and the second reset signals, the CPLD having:

a first register that the CPLD updates with the value written to the port of the bus by the system software component; and, a second register to which the CPLD copies the value currently stored within the first register before the CPLD resets the computing system in response to the CPLD receiving one of the first and the second reset signals, and wherein the second register is not affected during any reset or restart of the computing system other than reset of the computing system in response to the CPLD receiving one of the first and the second reset signals.

11. The computing system of claim 10, wherein the bus is a low-pin count (LPC) bus, the port of the bus is an input/output (I/O) port of the LPC bus, and the system software component is a basic input/output system (BIOS).

12. A computing system comprising:

a bus having a port, the port cleared during any restart or reset of the computing system;

a system software component to write a value to the port of the bus, the value relevant to debugging of the computing system when the computing system fails to perform as expected and/or as desired;

a reset button, where pressing of the reset button issues a reset signal;

a baseboard management controller (BMC) connected to the bus and capable of receiving the reset signal, the BMC having:

a first register that the BMC updates with the value written to the port of the bus by the component as the port is written to by the component; and, a second register to which the BMC copies the value currently stored within the first register before the BMC resets the computing system in response to one or more of the BMC deciding to reset the computing system and the BMC receiving the reset signal, and wherein the second register is not affected during any reset or restart of the computing system other than reset of the computing system in response to the one or more of the BMC deciding to reset the computing system and the BMC receiving the reset signal.

13. The computing system of claim 12, wherein the bus is a low-pin count (LPC) bus, the port of the bus is an input/output (I/O) port of the LPC bus, and the system software component is a basic input/output system (BIOS).

\* \* \* \* \*